United States Patent
Hirade et al.

(10) Patent No.: US 9,216,685 B2
(45) Date of Patent: Dec. 22, 2015

(54) POWER SUPPLY UNIT CONTROL DEVICE FOR INTERNAL COMBUSTION ENGINE DRIVEN VEHICLE AND INTERNAL COMBUSTION ENGINE DRIVEN VEHICLE EQUIPPED WITH POWER SUPPLY UNIT CONTROL DEVICE

(75) Inventors: Tsuyoshi Hirade, Kobe (JP); Yuki Yamashita, Kobe (JP); Megumu Iwakiri, Kobe (JP); Kenji Kimura, Namazu (JP)

(73) Assignees: KAWASAKI JUKOGYO KAUBHISKI KAISHA, Kobe (JP); KOKUSAN DENKI CO., LTD., Shizuoka (JP)

( * ) Notice: Subject to any disclaimer, the term of this patent is extended or adjusted under 35 U.S.C. 154(b) by 0 days.

(21) Appl. No.: 14/124,575

(22) PCT Filed: Jun. 29, 2012

(86) PCT No.: PCT/JP2012/004228
§ 371 (c)(1),
(2), (4) Date: Feb. 4, 2014

(87) PCT Pub. No.: WO2013/001831
PCT Pub. Date: Jan. 3, 2013

(65) Prior Publication Data
US 2014/0142808 A1   May 22, 2014

(30) Foreign Application Priority Data

Jun. 30, 2011   (JP) .................................. 2011-145821

(51) Int. Cl.
*G06F 7/00*     (2006.01)
*B60Q 1/04*     (2006.01)
*B60Q 1/00*     (2006.01)
*H05B 39/04*    (2006.01)

(52) U.S. Cl.
CPC ................ *B60Q 1/04* (2013.01); *B60Q 1/0088* (2013.01); *H05B 39/047* (2013.01)

(58) Field of Classification Search
CPC ................................. B60R 16/00; B60R 16/05
See application file for complete search history.

(56) References Cited

U.S. PATENT DOCUMENTS

2010/0166634 A1   7/2010   Rosenkilde

FOREIGN PATENT DOCUMENTS

JP   5168164      7/1993
WO   2008102378   8/2008

*Primary Examiner* — Michael D Lang
(74) *Attorney, Agent, or Firm* — Pearne & Gordon LLP

(57) ABSTRACT

There are provided a power supply unit control device for an internal combustion engine driven vehicle provided with a lamp driving switch for turning lamp-driving current supplied to a vehicle headlamp from a battery charged by the output of an AC generator driven by an internal combustion engine and with a conducting control unit for controlling the lamp driving switch. The conducting control unit normally performs on/off control of the lamp driving switch at a normal duty ratio, the normal duty ratio being an on/off duty ratio for the lamp driving switch at which lamp-driving current can be kept at a value not impeding the charging of the battery, and, when the internal combustion engine decelerates, performs engine deceleration lamp conducting control, in which on/off control of the lamp driving switch at the normal duty ratio is interrupted and the lamp driving switch is controlled so that lamp-driving current necessary to suppress reductions in the brightness of the headlamp is sent to the headlamp, only for a limited length of time.

7 Claims, 12 Drawing Sheets

N: CURRENT ROTATIONAL SPEED
Ns: SET ROTATIONAL SPEED
Dn: NORMAL DUTY RATIO
Dni: NORMAL DUTY RATIO DURING IDLING
Ds: SET DUTY RATIO

- N: CURRENT ROTATIONAL SPEED
- Ns: SET ROTATIONAL SPEED
- Dn: NORMAL DUTY RATIO
- Dni: NORMAL DUTY RATIO DURING IDLING
- Ds: SET DUTY RATIO
- Da: ACCELERATION CONTROL DUTY RATIO

N: CURRENT ROTATIONAL SPEED
Ns: SET ROTATIONAL SPEED
Dn: NORMAL DUTY RATIO
Dni: NORMAL DUTY RATIO DURING IDLING
Ds: SET DUTY RATIO
Da: ACCELERATION CONTROL DUTY RATIO

N: CURRENT ROTATIONAL SPEED
Ns: SET ROTATIONAL SPEED
Dn: NORMAL DUTY RATIO
Dni: NORMAL DUTY RATIO DURING IDLING
Ds: SET DUTY RATIO

POWER SUPPLY UNIT CONTROL DEVICE FOR INTERNAL COMBUSTION ENGINE DRIVEN VEHICLE AND INTERNAL COMBUSTION ENGINE DRIVEN VEHICLE EQUIPPED WITH POWER SUPPLY UNIT CONTROL DEVICE

TECHNICAL FIELD

The present invention relates to a power supply unit control device for controlling a power supply unit of an internal combustion engine driven vehicle, such as a motorcycle or buggy, and to an internal combustion engine driven vehicle equipped with the power supply unit control device.

BACKGROUND ART

In order to power various electrical components, internal combustion engine driven vehicles such as motorcycles and buggies are equipped with a power supply unit comprising an AC generator that is rotatably driven by the internal combustion engine and a battery that is charged by the output of the generator, the output of the power supply unit being used to supply electrical current to loads such as headlamps. In order to keep the battery in a suitably charged state, vehicles equipped with a power supply unit of this sort are equipped with a power supply unit control device comprising a battery charging control unit for controlling battery charging so as to keep battery terminal voltage at a set value while the internal combustion engine is running and a conducting control unit for controlling load conducting.

A magnetic AC generator provided with a magnetic rotor in which a magnetic field is formed by a permanent magnet and a stator having a magneto coil is usually used as the AC generator installed in internal combustion engine driven vehicles such as motorcycles and buggies. The magnetic AC generator has droop characteristics such that output voltage decreases when load current increases. Thus, in a vehicle in which a headlamp is illuminated by the output of a power supply unit provided with a magnetic AC generator driven by an internal combustion engine and a battery charged by the output of the unit, if a high rated consumed current is supplied to the headlamp when the engine is operating at low speed or idling, the output voltage of the magnetic AC generator is greatly decreased, becoming less than the battery voltage. In this state, a charging current cannot be supplied from the generator to the battery; thus, a high level of current is sent from the battery to the headlamp without the battery being charged, drastically draining the battery. If such a situation occurs frequently, there is a risk of the battery becoming over-discharged.

In the power supply unit control device for a internal combustion engine driven vehicle disclosed in Patent Document 1, a lamp driving switch is provided between the battery and the headlamp, and on/off control of the lamp driving switch is performed, thereby performing pulse width modulation (PWM) control of the lamp-driving current. In such a configuration, setting the PWM control duty ratio to a low value so as to limit the current flowing from the battery to the headlamp when the engine is running at low speed or idling, during which time the battery is not charged, limits the discharge current, suppressing battery drainage.

PRIOR ART DOCUMENTS

Patent Documents

[Patent Document 1] International Publication WO2008/102378

DISCLOSURE OF THE INVENTION

Problems to be Solved by the Invention

In accordance with the power supply unit control device disclosed in Patent Document 1, the level of current flowing to the headlamp from the battery is limited when the engine is operating at low speed or idling, when the generator output voltage decreases and the battery is charged, thereby suppressing battery drainage.

However, in the invention disclosed in Patent Document 1, when, for example, the brakes are applied in order to stop the vehicle, the on/off duty ratio of a switch for driving the lamp is set to a low value when an idling rotation speed is approached during the process of the internal combustion engine decreasing in rotational speed, leading to the problem of decreased headlamp brightness. In particular, when a driver engages the clutch and puts the internal combustion engine into an idling state when stopping the vehicle, there is a prominent, abrupt decrease in headlamp brightness.

An object of the present invention is to provide a power supply unit control device for an internal combustion engine driven vehicle configured so as to be capable of preventing abrupt decreases in headlamp brightness during the process of internal combustion engine deceleration and maintaining a high level of brightness for a predetermined period of time, as well as a vehicle provided with the device.

Means to Solve the Problems

The present invention lies in a power supply unit control device for an internal combustion engine driven vehicle, the device being provided with: a battery charging control unit for controlling the charging of a battery of a power supply unit of an internal combustion engine driven vehicle provided with a magnetic AC generator driven by an internal combustion engine for driving the vehicle and a battery charged by the output of the AC generator; a lamp driving switch for turning a lamp-driving current supplied from the battery to a headlamp of the vehicle on and off; and a lamp conducting control unit for performing PWM control of the lamp-driving current fundamentally by performing on/off control of the lamp driving switch using a normal duty ratio, the normal duty ratio being an on/off duty ratio for the lamp driving switch set so as to keep the lamp-driving current at a value in a range such that an output voltage equal to or greater than a terminal voltage of the battery is generated by the magnetic AC generator.

In the present invention, the lamp conducting control unit is configured so as to interrupt on/off control of the lamp driving switch at the normal duty ratio in a process in which the rotational speed of the internal combustion engine decreases towards an idling rotational speed during deceleration, and perform engine deceleration lamp conducting control, in which the lamp driving switch is controlled so that lamp-driving current necessary to suppress decreases in headlamp brightness is sent to the headlamp, only for a limited period of time.

In the configuration described above, when the internal combustion engine decelerates, on/off control of the lamp driving switch at the normal duty ratio for keeping the output voltage of the magnetic AC generator equal to or greater than the terminal voltage of the battery (i.e., for charging the battery without impediment) is interrupted during the process of the rotational speed of the engine approaching the idling rotational speed, and engine deceleration lamp conducting control, in which the lamp driving switch is controlled so that the lamp-driving current necessary to suppress reductions in headlamp brightness is sent to the headlamp, is performed. It is thereby possible to prevent abrupt reductions in headlamp brightness when the rotational speed decreases towards the idling rotational speed during engine deceleration, eliminating headlamp flickering and allowing a high level of brightness to be ensured for a predetermined period of time. In addition, engine deceleration lamp conducting control is performed only for a limited period of time, and, after control ends, the battery charging level can be increased, thereby allowing battery over-discharge to be prevented.

The lamp conducting control unit may be configured so as to perform engine deceleration lamp conducting control by performing on/off control of the lamp driving switch at a set duty ratio set to a value greater than the normal duty ratio of the internal combustion engine during idling, or to perform engine deceleration lamp conducting control by keeping the lamp driving switch in an "on" state.

Other aspects of the present invention will become apparent in the following description of an embodiment of the invention.

Advantageous Effects of the Invention

In accordance with the present invention, the lamp conducting control unit interrupts on/off control of the lamp driving switch at the normal duty ratio, intended to allow for unimpeded charging of the battery, during the process of the rotational speed decreasing towards an idling rotational speed when the internal combustion engine decelerates, and performs engine deceleration lamp conducting control, in which the lamp driving switch is controlled so as to send lamp-driving current necessary to suppress decreases in headlamp brightness to the headlamp, only for a limited period of time, thereby preventing abrupt decreases in headlamp brightness when the engine goes into idling during the process of engine deceleration, eliminating lamp flickering, and ensuring a high level of brightness for a predetermined period of time. In addition, engine deceleration lamp conducting control is performed only for a limited period of time, allowing battery over-discharge to be prevented.

BEST MODE FOR CARRYING OUT THE INVENTION

Figure 1:
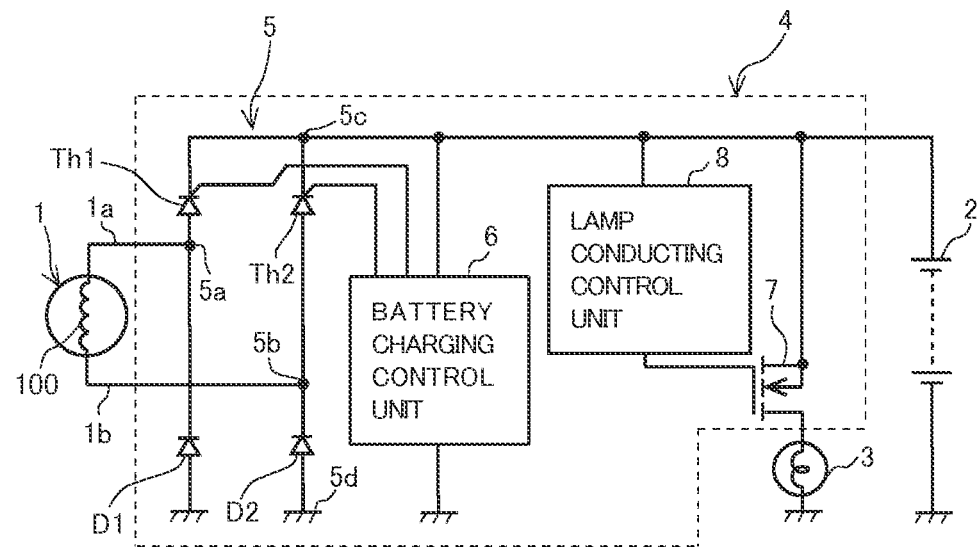
FIG. 1 is a circuit diagram showing the configuration of a power supply unit control device according to an embodiment of the present invention.

An embodiment of the present invention will be described hereafter with reference to the drawings. In the embodiment described hereafter, the internal combustion engine driven vehicle is a motorcycle. FIG. 1 shows an embodiment of the present invention; in the drawing, a reference numeral 1 is a magnetic AC generator (hereafter, simply an "AC generator") rotatably driven by an internal combustion engine for driving the motorcycle, 2 is a battery charged by the output of the AC generator 1, and 3 is a vehicle headlamp that illuminates upon receiving lamp-driving current from the battery 2. A reference numeral 5 is a control rectifier circuit, constituted by a mixed bridge circuit comprising a diode and a thyristor, for rectifying the output of the AC generator 1 and sending the output current to the battery 2 as charging current, 6 is a battery charging control unit controlling the control rectifier circuit 5 so as to keep the voltage at the two ends of the battery 2 at a set value, 7 is a lamp driving switch for turning the current supplied to the headlamp 3 on and off, and 8 is a lamp conducting control unit for performing on/off control of the lamp driving switch 7 at a predetermined duty ratio and performing PWM control so as to keep the lamp-driving current at a value not impeding the charging of the battery 2.

In the present embodiment, the AC generator 1 and the battery 2 constitute a power supply unit for conducting various electrical components, including the headlamp 3, and the control rectifier circuit 5, battery charging control unit 6, lamp driving switch 7, and lamp conducting control unit 8 constitute a power supply unit control device 4 for controlling the power supply unit.

To explain in further detail, the magnetic AC generator 1 is constituted by a rotor that is rotatably driven by a crank shaft of an internal combustion engine, not shown, installed on the chassis of a motorcycle and a stator constituted by winding a single-phase armature coil 100 around an iron armature core having a magnetic pole part facing a magnetic pole of the rotor across a gap, and induces a single-phase AC voltage in an armature coil 1a in synchronization with the rotation of the internal combustion engine. The output voltage of the magnetic AC generator exhibits droop characteristics with respect to the output current thereof, and output voltage decreases as output current increases. Thus, the power supply unit is constituted by the magnetic AC generator and the battery, which is charged by the magnetic AC generator, and, if loads are connected to both ends of the battery, the output voltage of the AC generator decreases when a large current is sent to the loads connected to the two ends of the battery, dropping to less than the terminal voltage of the battery, and the battery can no longer be charged.

The power supply unit control device 4 is power supply unit control device 4 constituted by the control rectifier circuit 5, constituted by a mixed bridge circuit comprising a diode and a thyristor, for rectifying the output of the AC generator 1 and sending the output current to the battery 2 as charging current, the battery charging control unit 6 for controlling the control rectifier circuit 5 so as to keep the voltage at the two ends of the battery 2 at a set value, the lamp driving switch 7, provided between the battery 2 and the headlamp 3, for turning the current supplied to the headlamp 3 on and off, and the lamp conducting control unit 8 for performing on/off control of the lamp driving switch 7 at a predetermined duty ratio and performing PWM control so as to keep the lamp-driving current at a value not impeding the charging of the battery 2.

The control rectifier circuit 5 is constituted by diodes D1, D2, anodes of which are connected to a shared ground circuit, and thyristors Th1, Th2, anodes of which are connected to cathodes of the diodes D1, D2, and cathodes of which have a shared connection. In the control rectifier circuit, the connection points between the cathodes of the diodes D1, D2 and the anodes of the thyristors Th1, Th2 form AC input terminals 5a, 5b, and the shared connection point of the cathodes of the thyristors Th1, Th2 and the shared connection point (ground) of the anodes of the diodes D1, D2 form a positive DC output terminal 5c and a negative DC terminal 5d, respectively. The AC input terminals 5a, 5b are connected to one output terminal 1a and another output terminal 1b of the AC generator 1, respectively, and the DC output terminals 5c, 5d and connected to a positive terminal and a negative terminal, respectively, of the battery 2.

The lamp driving switch 7 is constituted by an n-channel MOSFET, a source of which is connected to the positive terminal of the battery 2, and the headlamp 3 is connected between a drain thereof and the ground.

The battery charging control unit 6 is of a known configuration comprising a voltage detection circuit for detecting voltage (battery voltage) at the two ends of the battery 2, and a thyristor trigger control unit for controlling the supply of a trigger signal to the thyristors by sending a trigger signal to gates of the thyristors Th1, Th2 when the battery voltage detected by the voltage detection circuit is less than a set value, and stopping sending the trigger signal to the thyristors Th1, Th2 when the detected battery is equal to or greater than the set value. When the battery voltage is less than the set value and the trigger signal is being sent from the battery charging control unit to the thyristors Th1, Th2, that thyristor, of the thyristors of the control rectifier circuit 5, to which a forward voltage is being applied between the anode and cathode turns on, and a rectified output current of the AC generator 1 is sent to the battery 2 as charging current. When the battery voltage becomes equal to or greater than the set value and the trigger signal stops being sent to the thyristors Th1, Th2, the thyristors Th1, Th2 turn off when the anode currents thereof become equal to or less than a holding current, and charging current stops being sent to the battery 2. The battery charging control unit 6 keeps battery voltage at a set value by causing the control rectifier circuit 5 to perform these operations. If the battery voltage rating is 12 V, the set value for battery voltage is, for example, 14.5 V.

Apart from performing the control described above, the battery charging control unit 6 used in the present embodiment is configured so as to perform acceleration charging stop control, in which the trigger signal stops being sent to the thyristors Th1, Th2 and battery charging is stopped, when driver acceleration of the vehicle is detected in order to alleviate the load placed upon the internal combustion engine by the AC generator 1 and improve acceleration performance. The act of acceleration can be detected by monitoring the rotational speed of the internal combustion engine and checking whether the rate of rotational speed increase exceeds a set value, or by monitoring shifts in the position of an accelerator member, such as an accelerator grip. The rotational speed of the internal combustion engine can be detected from the output frequency of the AC generator 1. If there is provided a pulse generator for emitting a pulse whenever the rotational angular position of the crank shaft reaches a set position in order to obtain crank angle information and the like necessary in order to control internal combustion engine ignition timing and the like, the rotational speed of the engine can be detected by detecting the intervals at which the pulse generator generates pulses.

If the battery charging control unit 6 is configured so as to also perform acceleration charging stop control when comparatively gradual acceleration is performed during normal driving, it may not be possible to sufficiently charge the battery; thus, it is preferable that the battery charging control unit 6 perform acceleration charging stop control only when the vehicle is quickly accelerated at an acceleration rate equal to or greater than a set acceleration rate, and not perform acceleration charging stop control when the vehicle is accelerated comparatively gradually.

As is apparent from the foregoing description, various function-performing means are necessary in order to constitute the battery charging control unit 6, such as detecting means for detecting battery voltage or engine acceleration, various types of judging means for perform judgment processes such as judging whether battery voltage has exceeded a set value or whether acceleration has been performed at or above a set acceleration rate, and means for generating or ending the trigger signal sent to the thyristors Th1, Th2 on the basis of the judgment results. These means may be constituted by an analog circuit, or by having a microprocessor execute predetermined tasks. If an engine control unit (ECU) is provided in order to control the ignition system or fuel injection level of the internal combustion engine, means necessary for constituting the battery charging control unit can be manifested by having a microprocessor provided within the ECU execute a predetermined program. As a battery charging control unit for performing the various control operations described above is already widely known to persons skilled in the art, description of the circuit configuration thereof or algorithms for task processes executed by the microprocessor will be omitted.

In the present embodiment, thyristors are used as the switching means with which the control rectifier circuit 5 is provided in order to turn the charging current supplied to the battery on and off, but the control rectifier circuit 5 may also be constituted using another type of semiconductor switching element, such as a MOSFET or bipolar transistor. If a magnetic generator is used as the AC generator 1, a known short-circuiting regulator provided with a rectifier circuit for rectifying the output of the generator 1 and an output short circuit for passing the output of the rectifier circuit through a semiconductor switch and creating a short circuit when the battery voltage exceeds a set value can also be used in lieu of the control rectifier circuit 5.

The lamp conducting control unit 8 performs on/off control of the lamp driving switch 7 so as to keep the average value of the lamp-driving current IL flowing from the battery 2 through the lamp driving switch 7 to the headlamp 3 at a predetermined value. The lamp conducting control unit 8 performs PWM control of the lamp-driving current fundamentally by performing on/off control of the lamp driving switch using a normal duty ratio, the normal duty ratio being an on/off duty ratio Dn for the lamp driving switch 7 set so as to keep the lamp-driving current at a value in a range such that the lamp-driving current can be generated by the magnetic AC generator 1 at an output voltage equal to or greater than a terminal voltage of the battery 2. As long as PWM control of the lamp driving switch is performed at the normal duty ratio, the output current of the magnetic AC generator will not increase to a level that will decrease the output voltage of the power generator to or below the terminal voltage of the battery, allowing for unimpeded charging of the battery.

In the present embodiment, the lamp conducting control unit 8 is configured so as to interrupt on/off control of the lamp driving switch at the normal duty ratio when the rotational speed of the internal combustion engine decreases to a set rotational speed set higher than the idling rotational speed during the process of the rotational speed approaching the idling rotational speed when the engine decelerates, and perform engine deceleration lamp conducting control, in which on/off control of the lamp driving switch 7 is performed at a set duty ratio Ds set to a value higher than an internal combustion engine idling normal duty ratio Dni, only for a limited time. The set duty ratio Ds is set to a value sufficiently higher than an internal combustion engine idling normal duty ratio Dn. The lamp conducting control unit 8 needs information regarding the rotational speed of the internal combustion engine in order to perform the engine deceleration lamp conducting control described above. In the present embodiment, information on the output voltage of the AC generator 1 is inputted into the lamp conducting control unit 8 in order to provide the lamp conducting control unit 8 with information on the rotational speed of the internal combustion engine. The lamp conducting control unit 8 obtains rotational speed information for the internal combustion engine from the output frequency of the AC generator 1.

Figure 4:
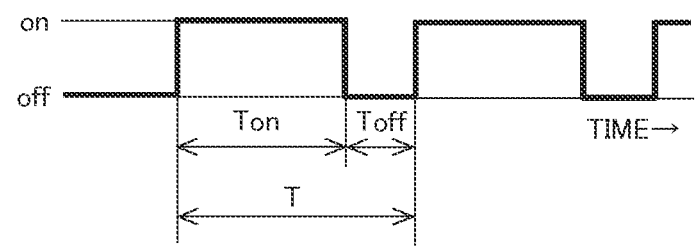
FIG. 4 is a graph illustrating the definition of "duty ratio" used in the present specification.

In the present specification, the term "on/off duty ratio D of the lamp driving switch" is used to signify the proportion of one on/off cycle of the switch 7 taken up by the period during which the switch 7 is on. In other words, taking Ton as the on period of the switch 7, Toff as the Off period, and T (=Ton+Toff) as one on/off cycle, the value yielded by D=(Ton/T)×100% is the on/off duty ratio D of the lamp driving switch, as shown in FIG. 4.

Figure 2:
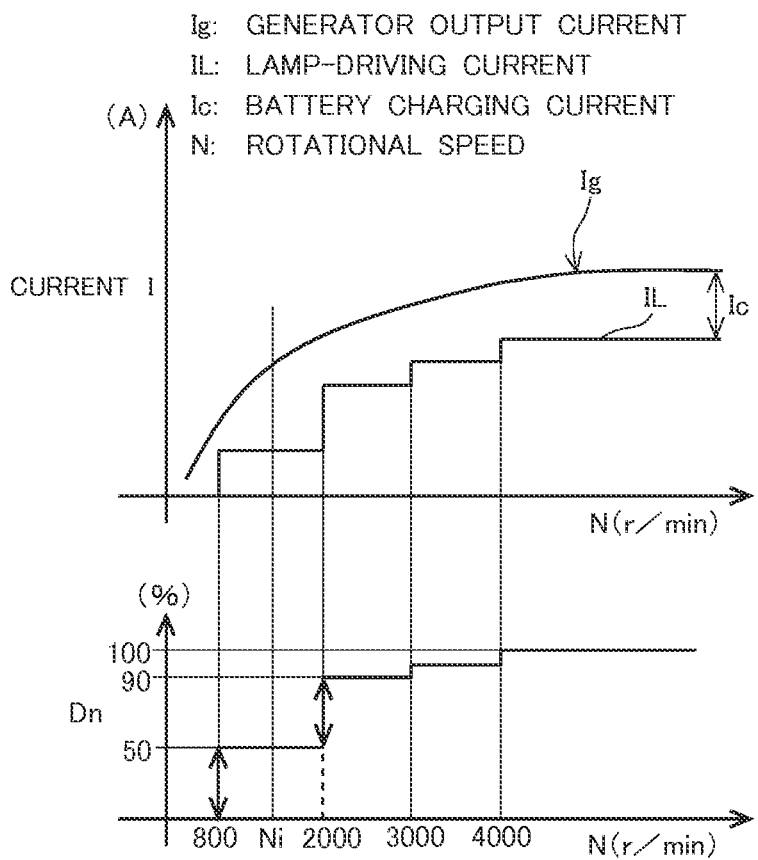
FIG. 2 is a graph showing an example of changes in the output current of an AC generator and headlamp current consumption with regard to rotational speed and changes in duty ratio during PWM control of lamp-driving current in a power supply unit control device according to the present invention.

FIG. 2 shows the basic operations of the lamp conducting control unit 8 of the power supply unit control device according to the present embodiment; in the drawing, Ig is the output current outputted from the AC generator 1 via the control rectifier circuit 5, and IL schematically shows a lamp-driving current flowing from the battery 2 through the lamp driving switch 7 to the headlamp 3. Dn is an example of a normal on/off duty ratio for the lamp driving switch 7, and N is an example of the rotational speed (r/min) of the internal combustion engine driving the AC generator 1. The normal duty ratio Dn is determined so as to keep the lamp-driving current IL flowing from the battery 2 through the lamp driving switch 7 to the headlamp 3 at a value not impeding the charging of the battery 2 (i.e., allowing the charging current to flow unimpeded) at each rotational speed N of the internal combustion engine.

In the example shown in the drawing, the normal duty ratio Dn is increased stepwise as the rotational speed N rises, and the idling normal duty ratio Dn is set to 50% and the normal duty ratio Dn when the engine rotational speed N is 2000 r/min is set to 90%. In FIG. 2, the current difference Ic between the output current Ig and the lamp-driving current IL of the power generator becomes the charging current flowing to the battery 2. In the present embodiment, the rotational speed when engine startup is complete is set to 500 r/min, and the idling rotational speed to Ni (>800 r/min).

The lamp conducting control unit 8 calculates a normal duty ratio Dn for the engine rotational speed N, and the calculated normal duty ratio Dn is used to send a drive signal Vd having a square waveform that varies between a high level and a low level is sent to a gate of the MOSFET constituting the lamp driving switch 7. The lamp driving switch 7 is thus turned on and off at the normal duty ratio Dn, and PWM control of the lamp-driving current IL sent from the battery 2 to the headlamp 3 is performed. This control prevents the output current of the magnetic AC generator 1 from becoming excessive and the output voltage thereof decreasing to the terminal voltage of the battery 2 or less, preventing the occurrence of a state in which the battery is not charged.

The lamp conducting control unit 8 used in the present embodiment is configured so as to cause a timer to begin measuring a predetermined length of time when the rotational speed of the internal combustion engine decreases to a set rotational speed that is a predetermined rotational speed greater than the idling rotational speed during the process of the engine decelerating when, for example, the vehicle is decelerated or stopped, and to fix the on/off duty ratio of the lamp driving switch at a set duty ratio while the timer is measuring the predetermined length of time.

Such a configuration allows the time for which engine deceleration lamp conducting control is controlled to be easily set. In addition, the time for which engine deceleration lamp conducting control is performed can be freely adjusted by altering the time measured by the timer.

The set duty ratio is preferably set equal to the normal duty ratio of the set rotational speed. Setting the set duty ratio in this way allows flickering of the headlamp when engine deceleration lamp conducting control is begun to be prevented.

In addition, it is preferable that, once measurement of the set time is complete, the lamp conducting control unit 8 gradually alters the duty ratio towards the normal duty ratio used during idling.

Such a configuration allows abrupt reductions in headlamp brightness when engine deceleration lamp conducting control ends to be prevented, thereby allowing the brightness of the headlamp to be gradually decreased without creating an unnatural feel for the driver.

Figure 3:
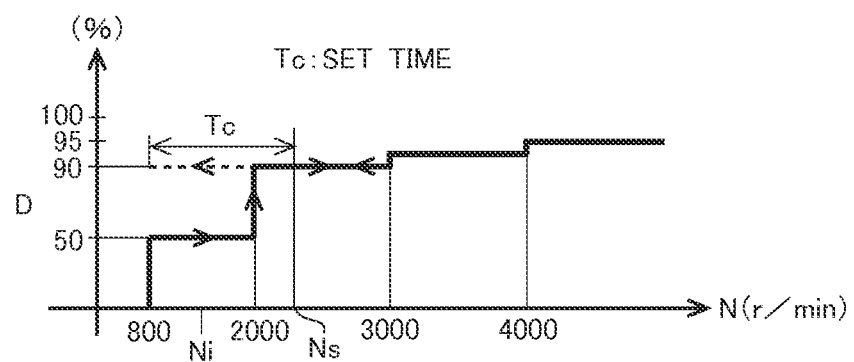
FIG. 3 is a graph illustrating vehicle stopping duty ratio control performed in the present invention.

When a driver starts the vehicle off, the lamp conducting control unit 8 used in the present embodiment increases the on/off duty ratio D of the lamp driving switch 7 from 50% to 90% when the rotational speed N of the engine reaches 2,000 r/min, and switches the duty ratio D to 95% when the rotational speed N reaches 3,000 r/min, and to 100% when the rotational speed N reaches 4,000 r/min, as shown in FIG. 3. When, for example, the driver brakes in order to stop the vehicle, the lamp conducting control unit 8 causes the timer to measure a set time Tc when the rotational speed N decreases to a set speed Ns set higher than the idling rotational speed during the process of the engine decelerating and the rotational speed thereof approaching the idling rotational speed, and performs engine deceleration lamp conducting control, in which the on/off duty ratio D of the lamp driving switch 7 is fixed at the set duty ratio Ds (90% in the example shown in the drawing) set higher than the normal duty ratio used during idling (50%), while the timer performs this measurement. In the present embodiment, the set duty ratio Ds is set equal to the normal duty ratio of the set rotational speed Ns.

Causing the lamp conducting control unit 8 to perform the control described above interrupts the on/off control of the lamp driving switch at the normal duty ratio before the engine rotational speed decreases and the on/off duty ratio of the lamp driving switch the normal duty ratio used during idling during the process of, for example, the vehicle stopping or decelerating, allowing on/off control of the lamp driving switch to be performed at the set duty ratio Ds set to a value higher than the normal duty ratio of the internal combustion engine used during idling. It is thereby possible to prevent abrupt decreases in headlamp brightness during the process of the rotational speed approaching the idling rotational speed when the engine decelerates, prevent flickering, and keep the headlamp at a high level of brightness for a predetermined period of time. In addition, engine deceleration lamp conducting control is performed only for a limited period of time Tc, allowing battery over-discharge to be prevented.

Figure 5:
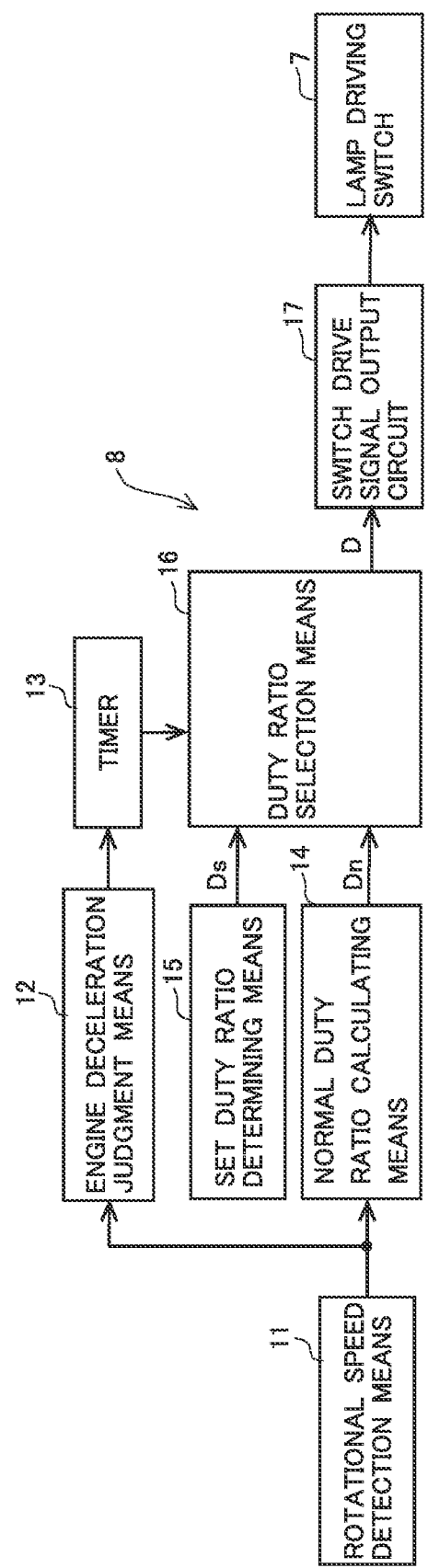
FIG. 5 is a functional block diagram showing the configuration of a lamp conducting control unit used in an embodiment of the present invention.

The lamp conducting control unit 8 having the functions described above can be manifested by causing a microprocessor provided in an ECU installed in the vehicle to execute a predetermined program. FIG. 5 is a functional block diagram of one example of function blocks constituted by software when the lamp conducting control unit 8 is manifested via a microprocessor. In FIG. 5, 11 is rotational speed detection means for detecting the rotational speed of the internal combustion engine; in the present embodiment, the rotational speed detection means is configured so as to detect the rotational speed of the engine from the output frequency of the magnetic AC generator 1. The rotational speed detection means 11 can also be constituted by means for obtaining separately detected obtained engine rotational speed information for controlling the ignition timing and the like of the internal combustion engine.

A reference numeral 12 is engine deceleration judgment means for judging whether the rotational speed of the engine has reached a set rotational speed set to a value greater than the idling rotational speed during the process of engine deceleration on the basis of changes in the rotational speed of the internal combustion engine detected by the rotational speed detection means 11, and 13 is a timer for beginning measurement of the set time Tc when the engine deceleration judgment means 12 judges that the engine rotational speed has decreased to the set rotational speed during the deceleration process. 14 is normal duty ratio calculating means for calculating a normal duty ratio Dn for the rotational speed N detected by the rotational speed detection means 11 at which the lamp-driving current IL can be kept at a value that will not impede the charging of the battery 2 (i.e., at which the charging current can be sent without impediment). The normal duty ratio Dn can be calculated by searching a map (table) showing the relationship between the rotational speed N of the engine and the normal duty ratio Dn for the rotational speed N.

A reference numeral 15 represents set duty ratio determining means for determining the set duty ratio Ds, this means being constitutable by storage means for storing a predetermined set duty ratio Ds. 16 represents duty ratio selection means, the selections means being configured so as to select and output the normal duty ratio Dn calculated by the normal duty ratio calculating means 14 as the on/off duty ratio D of the lamp driving switch 7 when the engine deceleration judgment means 12 judges that the engine is not decelerating, or that the engine is decelerating but the rotational speed thereof has not yet decreased to the set rotational speed, and the timer 13 is not measuring time, and to select and output the set duty ratio Ds as the on/off duty ratio D of the lamp driving switch 7 when the engine deceleration judgment means 12 judges that the engine has decreased to the set rotational speed during deceleration, and the timer 13 is measuring time.

The duty ratio selection means 16 sends the selected duty ratio D to a switch drive signal output circuit 17. The switch drive signal output circuit 17 sends the signal sent from the duty ratio selection means 16 to a control terminal (in the example shown in the drawings, a MOSFET gate) of the lamp driving switch 7 as a drive signal (the square waveform signal shown in FIG. 4) suitable for driving the lamp driving switch 7. In the example shown in FIG. 5, the lamp conducting control unit 8 is constituted by the rotational speed detection means 11, the engine deceleration judgment means 12, the timer 13, the normal duty ratio calculating means 14, the set duty ratio determining means 15, the duty ratio selection means 16, and the switch drive signal output circuit 17.

Figure 6:
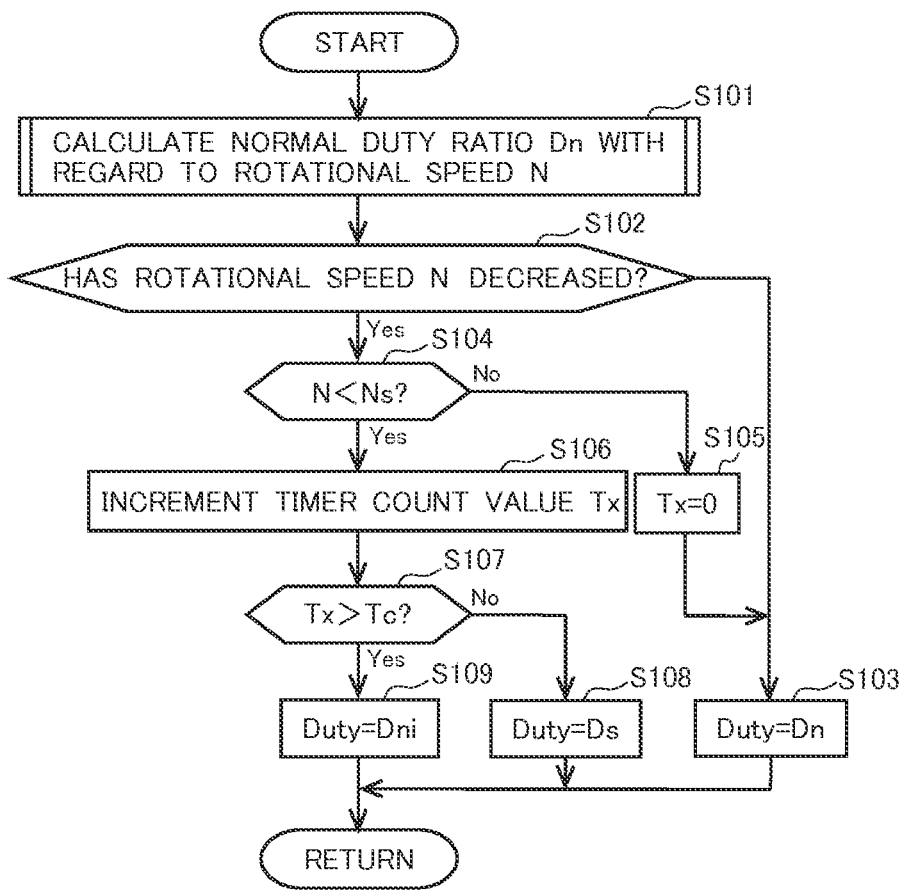
FIG. 6 is a flow chart showing an example of an algorithm for a program executed by a microprocessor in order to constitute the lamp conducting control unit shown in FIG. 5.

FIG. 6 is a flow chart showing an example of an algorithm for a task process executed by a microprocessor in order to constitute the lamp conducting control unit shown in FIG. 5. The process shown in FIG. 6 is executed whenever a task process timing arising at predetermined time intervals is reached. When the task process is begun, the normal duty ratio Dn is calculated for the current rotational speed N of the internal combustion engine in step S101. Next, in step S102, it is judged whether the rotational speed N has decreased below that at the time of the previous task process, and, if the result is that the rotational speed N has not decreased, the process continues to step S103, and the process is ended with the normal duty ratio Dn calculated in step S101 used as the duty ratio D.

If it is judged in step S102 that the rotational speed has decreased below the rotational speed at the time of the previous task process, the process continues to step S104, and it is judged whether the current rotational speed N is lower than the set rotational speed Ns. If it is judged, as a result, that the rotational speed N is equal to or greater than the set rotational speed Ns, a timer measurement value Tx is reset to 0 in step S105, the process continues to step S103, and the process is ended with the normal duty ratio Dn calculated in step S101 used as the duty ratio D. If it is judged in step S104 that the rotational speed N of the engine is lower than the set rotational speed Ns, the process continues to step S106, the timer measurement value Tx is incremented by 1, and, in a subsequent step S107, it is judged whether the timer measurement value Tx has reached a set time Tc. If, as a result, it is judged that the timer measurement value Tx has not reached the set time Tc (i.e., the timer has not finished measuring the set time), the process continues to step S108, and the process ends with the set duty ratio Ds used as the duty ratio D. If is determined in step S107 that the timer measurement value Tx has reached the set value Tc (i.e., that measurement of the set time has completed), the process continues to step S109, and the process is ended with the normal duty ratio Dni used during idling calculated in step S101 used as the duty ratio D.

In the case of the algorithm shown in FIG. 6, the normal duty ratio calculating means 14 is constituted by step S101, and the engine deceleration judgment means 12 is constituted by steps S102 and S104. The duty ratio selection means 16 is constituted by steps S103, S107, S108, and S109. In addition, steps S105 and S106 constitute timer control means (not shown in FIG. 5) for controlling the timer 13 so that the timer 13 is set to a set time and begins measuring the same when the rotational speed of the engine decreases to set rotational speed Ns, and clearing the timer 13 when the rotational speed N becomes equal to or greater than the set rotational speed Ns while the timer 13 is measuring the set time.

If, in an internal combustion engine driven vehicle installed with a battery, the battery is being charged when the vehicle is accelerated, the load placed on the engine by the AC generator increases, making decreases in acceleration performance inevitable. In order to solve this problem, a battery charging control unit is constituted so as to perform acceleration charging stop control, in which battery charging is stopped, when it is detected that the vehicle is being accelerated. When acceleration charging stop control is being performed, the voltage of the battery decreases; thus, if the duty ratio is constant during the PWM control of the lamp-driving current, the level of drive current to the headlamp will decrease when acceleration charging stop control is begun, causing flickering and potentially creating an unnatural feeling for the driver.

Thus, if the battery charging control unit is configured so as to perform acceleration charging stop control, in which battery charging is stopped, when it is detected that the vehicle has been accelerated, it is preferable that the lamp conducting control unit be configured so as to perform acceleration duty control, in which the duty ratio is increased to an acceleration control duty ratio set to a value equal to or greater than the normal duty ratio immediately before acceleration charging stop control is begun, when acceleration charging stop control is being performed.

Such a configuration allows reductions in the amount of current flowing to the headlamp when acceleration charging stop control is performed and battery voltage decreases to be prevented, allowing headlamp flickering to be prevented.

The lamp conducting control unit may be configured so as to use a map showing the relationship between the rotational speed during acceleration control and the duty ratio during charging stop control and the map with regard to rotational speed in order to determine the acceleration control duty ratio, or to determine the acceleration control duty ratio by adding a constant value to the duty ratio immediately prior to the starting of acceleration charging stop control.

If the battery charging control unit is configured so as to perform acceleration charging stop control, in which battery charging is stopped, when it is detected that the vehicle has been accelerated, the lamp conducting control unit may be configured so as to monitor battery voltage when acceleration charging stop control is being performed, and determine the duty ratio according to the battery voltage in order to keep headlamp brightness at the brightness less immediately prior to the starting of acceleration charging stop control.

Figure 7:
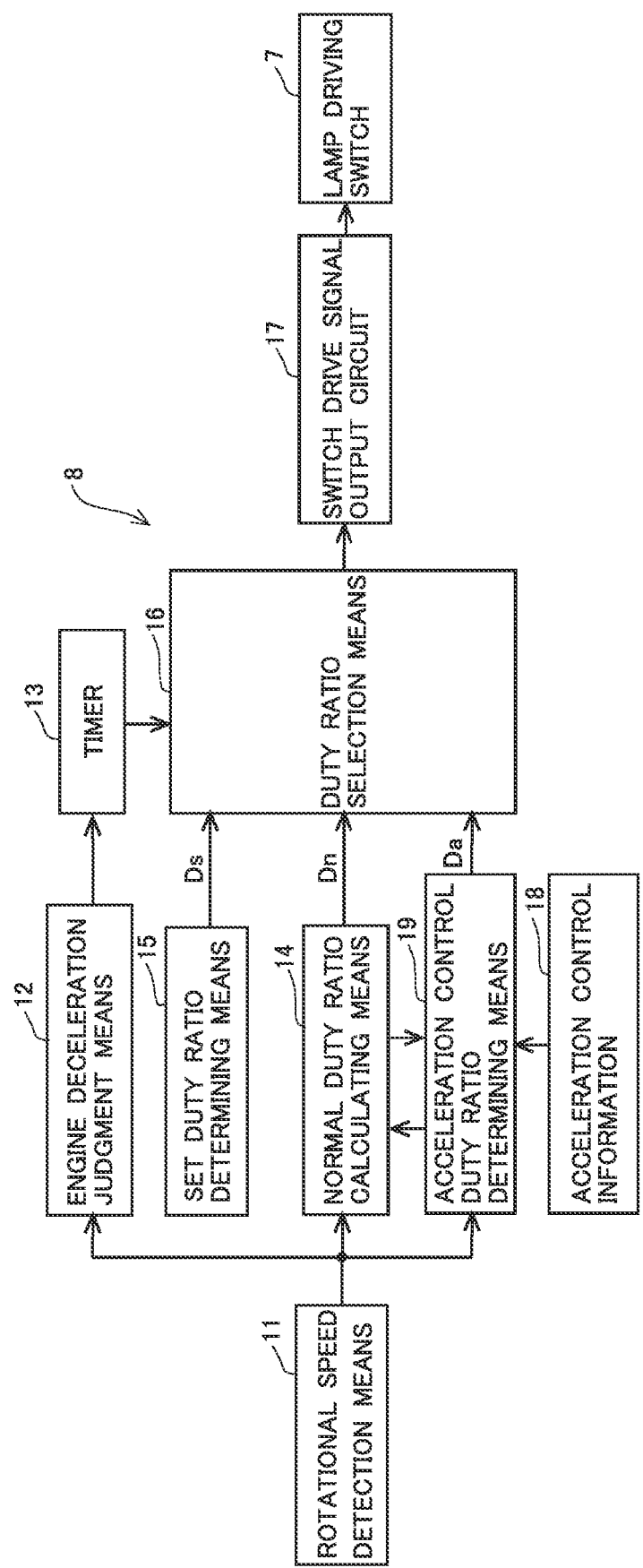
FIG. 7 is a functional block diagram showing the configuration of a lamp conducting control unit used in another embodiment of the present invention.

FIG. 7 is a functional block diagram showing another example of function blocks constituted by software when the lamp conducting control unit 8 is constituted using a microprocessor in another embodiment of the present invention. In the present embodiment, the battery charging control unit 6 shown in FIG. 1 is configured so as to perform acceleration charging stop control, in which battery charging is stopped, when it is detected that the vehicle has been accelerated. Performing acceleration charging stop control, in which battery charging is stopped, when the vehicle is accelerated reduces battery voltage, potentially reducing the brightness of the headlamp 3 and creating an unpleasant sensation for the driver. The present embodiment is configured so as to prevent reductions in headlamp brightness when the battery charging control unit 6 is performing acceleration charging stop control. The present embodiment is configured so that, when acceleration charging stop control is being performed, the lamp conducting control unit 8 performs acceleration duty control, in which the on/off duty ratio of the lamp driving switch 7 is increased to an acceleration control duty ratio set to a value equal to or greater than the normal duty ratio immediately prior to the starting of acceleration charging stop control.

In the embodiment shown in FIG. 7, means 18 for providing acceleration control information and acceleration control duty ratio determining means 19 are provided in addition to the features shown in FIG. 5. The acceleration information is information showing that the battery charging control unit 6 is performing acceleration charging stop control, and can be obtained from the battery charging control unit 6.

The acceleration control duty ratio determining means 19 is means for determining an acceleration control duty ratio Da having a value equal to or greater than the normal duty ratio immediately prior to the starting of acceleration charging stop control when acceleration charging stop control is being performed. For example, when acceleration charging stop control is performed when the engine rotational speed N is 3,500 r/min in FIG. 3, the acceleration control duty ratio determining means 19 sets the acceleration control duty ratio Da to a duty ratio (for example, 100%) that is greater than the normal duty ratio (for example, 95%) at 3,500 r/min. If the normal duty ratio immediately prior to the starting of acceleration charging stop control is 100%, the acceleration control duty ratio Da is 100%.

The acceleration control duty ratio determining means 19 is configured so as to use a map showing the relationship between the rotational speed of the internal combustion engine and the acceleration control duty ratio during acceleration control, and determining the acceleration control duty ratio Da by searching the map with regard to the rotational speed N of the internal combustion engine.

If the on/off duty ratio of the lamp driving switch is increased when acceleration charging stop control is being performed, as in the present embodiment, decreases in headlamp power supply can be prevented even if battery voltage is reduced due to charging being stopped, thereby allowing reductions in headlamp brightness when acceleration charging stop control is performed to be prevented. The other features of the lamp conducting control unit shown in FIG. 7 are similar to those shown in FIG. 5.

Figure 8:
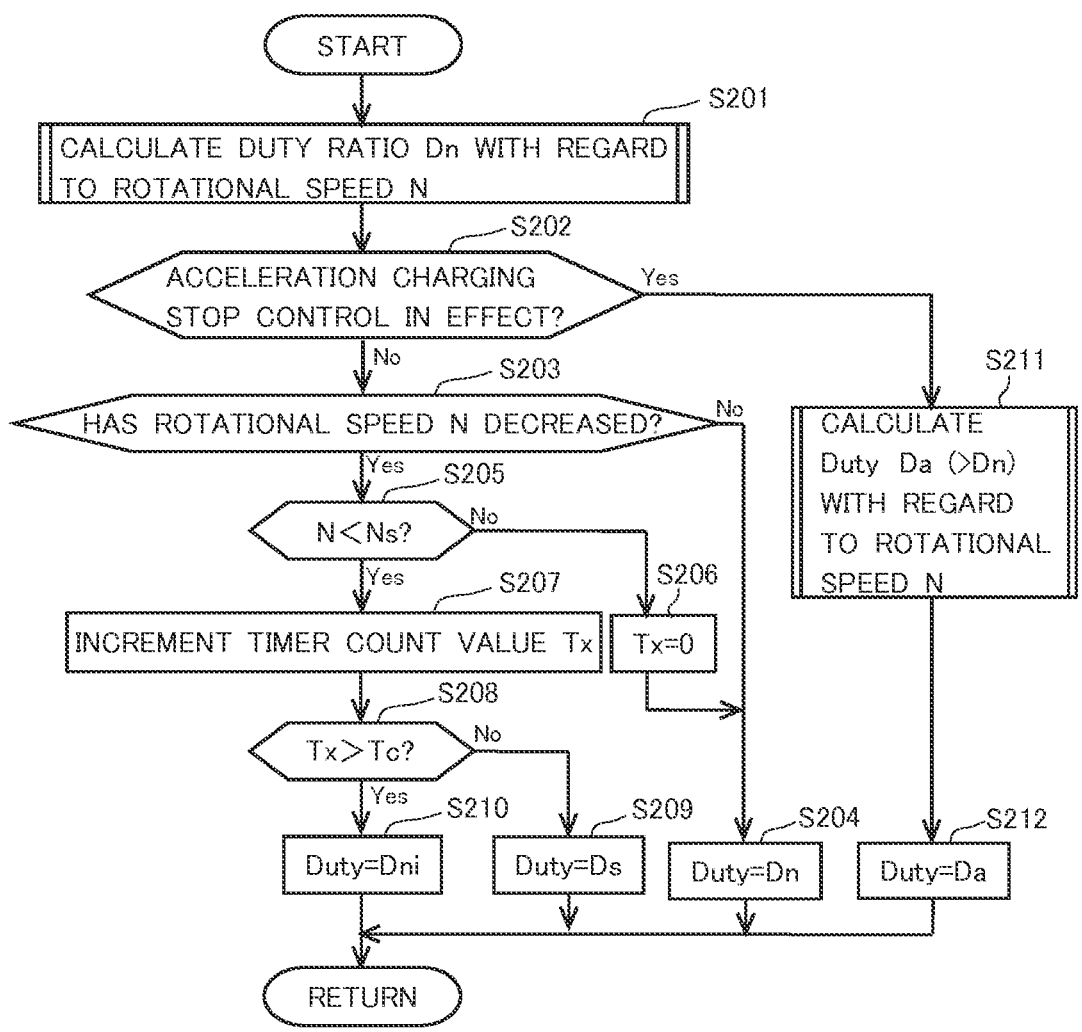
FIG. 8 is a flow chart showing another example of an algorithm for a program executed by a microprocessor in order to constitute the lamp conducting control unit shown in FIG. 7.

FIG. 8 is a flow chart showing an example of an algorithm for a task process executed by a microprocessor in order to constitute the lamp conducting control unit shown in FIG. 7. In FIG. 8, steps S203 through S210 are identical to steps S102 through S109 in FIG. 6. The process shown in FIG. 8 is also executed whenever a task process timing arising at predetermined time intervals is reached. When the task process is begun, the normal duty ratio Dn is calculated for the current rotational speed N of the internal combustion engine in step S201. Next, in step S202, it is judged whether the battery charging control unit is performing acceleration charging stop control. If, as a result, it is judged that acceleration charging stop control is not being performed, the process continues to step S203. If it is judged in step S202 that acceleration charging stop control is being performed, the process continues to step S211, an acceleration control duty ratio Da is calculated for the rotational speed N, an acceleration control duty ratio Da having a value equal to or greater than the normal duty ratio immediately prior to the starting of acceleration charging stop control, and, in step S212, the process is ended using the on/off duty ratio of the lamp driving switch as the calculated acceleration control duty ratio Da. The process is otherwise identical to the embodiment shown in FIG. 6.

In the case of the algorithm shown in FIG. 8, the normal duty ratio calculating means 14 is constituted by step S201, and the engine deceleration judgment means 12 is constituted by steps S203 and S205. The duty ratio selection means 16 is constituted by steps S204, S209, S210, and S212. In addition, steps S206 and S207 constitute timer control means (not shown in FIG. 7) for controlling the timer 13 so that the timer 13 is set to a set time and begins measuring the same when the rotational speed of the engine decreases to set rotational speed Ns, and clearing the timer 13 when the rotational speed N becomes equal to or greater than the set rotational speed Ns while the timer 13 is measuring the set time. The acceleration control duty ratio determining means 19 is constituted by step S211.

Figure 9:
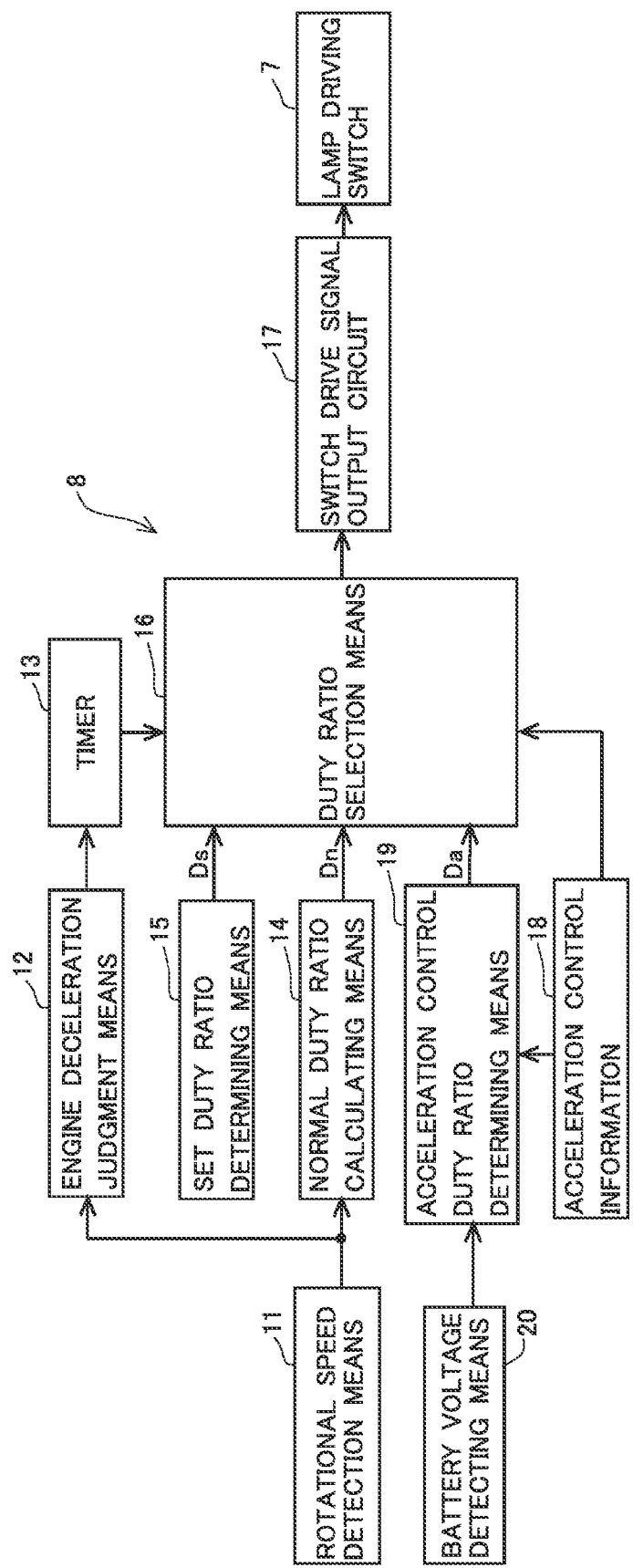
FIG. 9 is a functional block diagram showing the configuration of a lamp conducting control unit used in yet another embodiment of the present invention.

FIG. 9 is a functional block diagram showing yet another example of function blocks constituted by software when the lamp conducting control unit 8 is constituted using a microprocessor in another embodiment of the present invention. In the present embodiment, the lamp conducting control unit 8 is configured so as to monitor battery voltage when acceleration charging stop control is being performed, and determine the acceleration control duty ratio according to the battery voltage in order to keep headlamp brightness at the brightness immediately prior to the starting of acceleration charging stop control. Thus, the battery conducting control unit 8 shown in FIG. 9 is provided with battery voltage detecting means 20 for detecting battery voltage, and is configured so that, when acceleration control charging stop control is being performed, the acceleration control duty ratio determining means 19 searches a map with regard to the battery voltage detected by the battery voltage detecting means 20, thereby determining the acceleration control duty ratio. Other points are similar to the example shown in FIG. 7.

Figure 10:
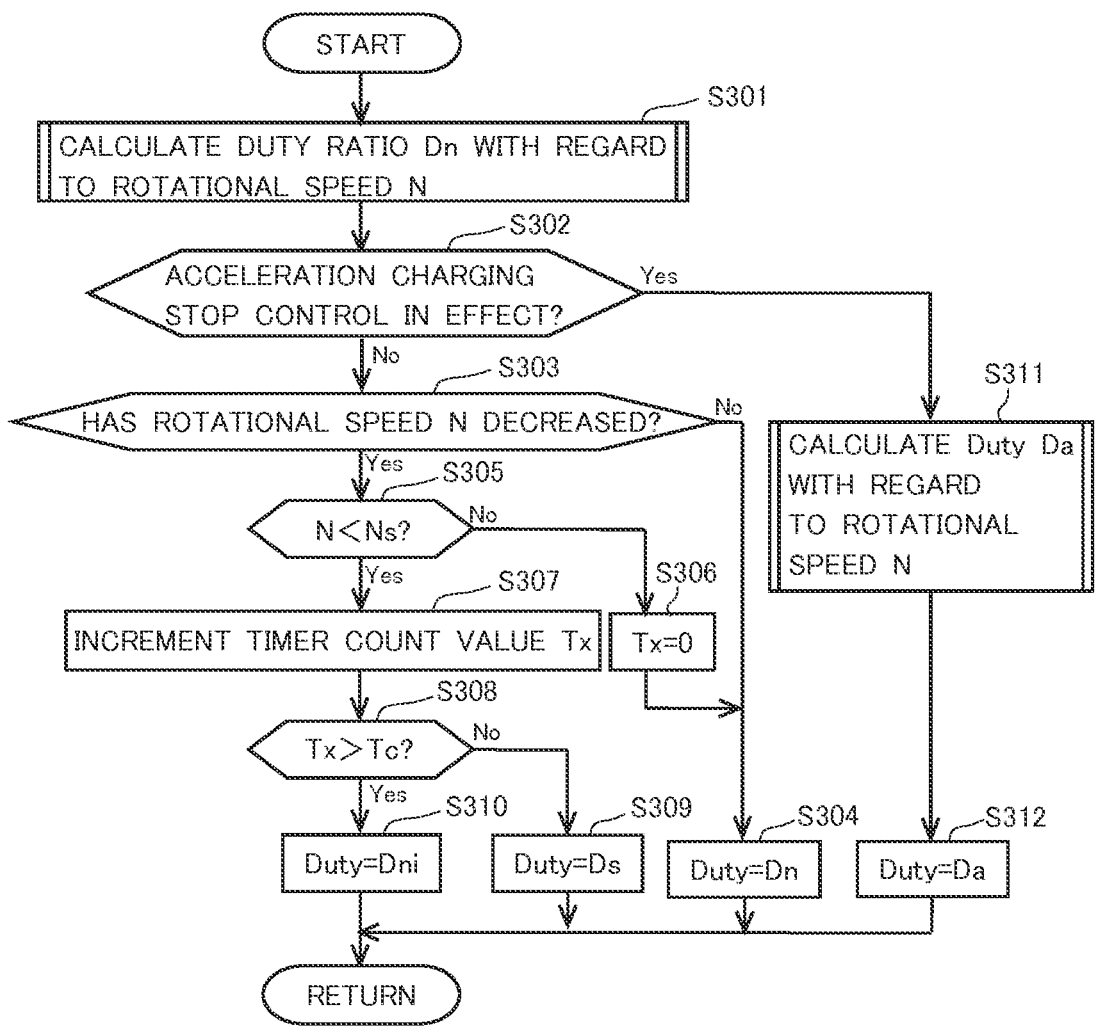
FIG. 10 is a flow chart showing yet another example of an algorithm for a program executed by a microprocessor in order to constitute the lamp conducting control unit shown in FIG. 9.

FIG. 10 is a flow chart showing an example of an algorithm for a task process executed by a microprocessor in order to constitute the lamp conducting control unit shown in FIG. 9. In FIG. 10, step S301 is identical to step S101 in FIG. 6, and steps S303 through S310 are identical to steps S101 through S109 in FIG. 6. The process shown in FIG. 10 is also executed whenever a task process timing arising at predetermined time intervals is reached. When the task process is begun, the normal duty ratio Dn is calculated for the current rotational speed N of the internal combustion engine in step S301. Next, in step S302, it is judged whether the battery charging control unit is performing acceleration charging stop control. If, as a result, it is judged that acceleration charging stop control is not being performed, the process continues to step S303. If it is judged in step S302 that acceleration charging stop control is being performed, the process continues to step S311, an acceleration control duty ratio Da having a value necessary to keep headlamp brightness constant is calculated for the battery voltage, and, in step S312, the process is ended using the on/off duty ratio of the lamp driving switch as the calculated acceleration control duty ratio Da. The process is otherwise identical to the embodiment shown in FIG. 6.

In the case of the algorithm shown in FIG. 10, the normal duty ratio calculating means 14 is constituted by step S301, and the engine deceleration judgment means 12 is constituted by steps S303 and S305. The duty ratio selection means 16 is constituted by steps S304, S309, S310, and S312. In addition, steps S306 and S307 constitute timer control means for controlling the timer 13 so that the timer 13 is set to a set time and begins measuring the same when the rotational speed of the engine decreases to set rotational speed Ns, and clearing the timer 13 when the rotational speed N becomes equal to or greater than the set rotational speed Ns while the timer 13 is measuring the set time. The acceleration control duty ratio determining means 19 is constituted by step S311.

Figure 11:
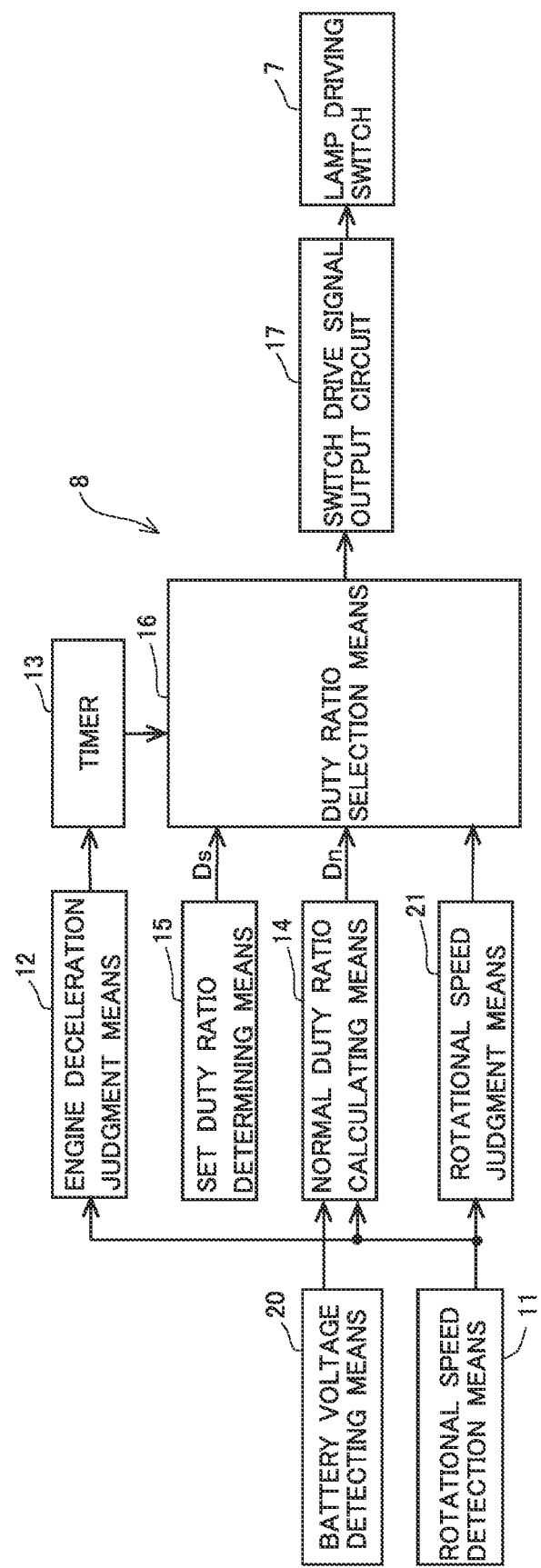
FIG. 11 is a functional block diagram showing the configuration of a lamp conducting control unit used in yet another embodiment of the present invention.

FIG. 11 is a functional block diagram showing yet another example of function blocks constituted by software when the lamp conducting control unit 8 is constituted using a microprocessor in another embodiment of the present invention. The present embodiment is provided with rotational speed judgment means 21 for judging whether the rotational speed is equal to or greater than the set value on the basis of the rotational speed detected by the rotational speed detection means 11. Also provided is battery voltage detecting means 20 for detecting battery voltage, and the normal duty ratio calculating means 14 is configured so as to calculate a normal duty ratio Dn with regard to the rotational speed of the internal combustion engine when the rotational speed of the internal combustion engine is less than the set value, and to calculate a normal duty ratio Dn with regard to the battery voltage when the rotational speed of the internal combustion engine is equal to or greater than the set value. Other points are similar to the lamp conducting control unit 8 of the embodiment shown in FIG. 5.

Figure 12:
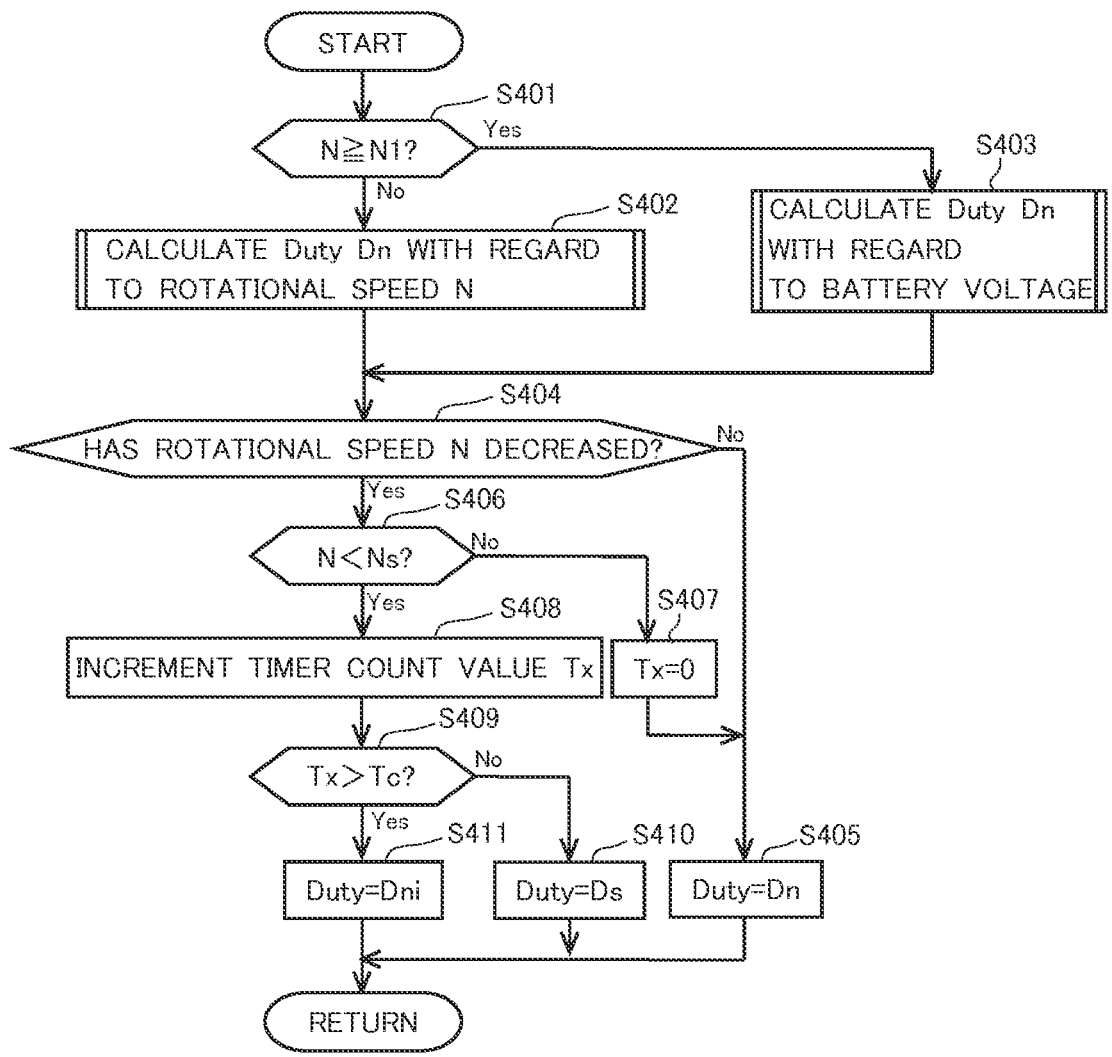
FIG. 12 is a flow chart showing yet another example of an algorithm for a program executed by a microprocessor in order to constitute the lamp conducting control unit shown in FIG. 11.

FIG. 12 is a flow chart showing an example of an algorithm for a task process executed by a microprocessor in order to constitute the lamp conducting control unit shown in FIG. 11. In FIG. 12, step S402 and steps S404 through S411 are identical to steps S101 through S109 in FIG. 6. The process shown in FIG. 12 is also executed whenever a task process timing arising at predetermined time intervals is reached. When the task process is begun, it is first judged, in step S401, whether the rotational speed N of the engine is equal to or greater than a set rotational speed N1. If, as a result, it is judged that the rotational speed N is less than the set value N1, a map is searched with regard to the current rotational speed N in step S402, and the normal duty ratio Dn is calculated. If it is judged in step S401 that the rotational speed N is equal to or greater than the set value N1, the map is searched with regard to battery voltage in step S403, and the normal duty ratio Dn is calculated. After steps S402 and 403 are executed, the process continues to step S404. The process is otherwise identical to the embodiment shown in FIG. 6.

In the case of the algorithm shown in FIG. 12, the rotational speed judgment means 21 is constituted by step S401, and the normal duty ratio calculating means 14 is constituted by steps S402 and S403. The engine deceleration judgment means 12 is constituted by steps S404 and S406, and the duty ratio selection means 16 by steps S405, S409, S410, and S411. In addition, steps S406 and S407 constitute timer control means for controlling the timer 13 so that the timer 13 is set to a set time and begins measuring the same when the rotational speed of the engine decreases to set rotational speed Ns, and clearing the timer 13 when the rotational speed N becomes equal to or greater than the set rotational speed Ns while the timer 13 is measuring the set time.

If the lamp conducting control unit 8 is configured so as to calculate the normal duty ratio Dn with regard to the rotational speed of the internal combustion engine when the rotational speed of the internal combustion engine is less than the set value and with regard to battery voltage when the rotational speed of the internal combustion engine is equal to or greater than the set value, as in the embodiment shown in FIGS. 11 and 12, it is possible to perform control keeping the brightness of the headlamp 3 constant even if any type of control (for example, acceleration charging stop control) causing reductions in battery voltage is performed while the vehicle is being driven.

If it is mandatory for the headlamp to be kept illuminated during driving regardless of the time of day, as in the case of a motorcycle or the like, the vehicle may be configured so as to illuminate the headlamp simultaneously with the key switch being closed when the vehicle is started, or so as to illuminate the headlamp simultaneously with internal combustion engine startup being completed. In such internal combustion engine driven vehicles, when the internal combustion engine is started at a low temperature after having been stopped for a extended period of time, the engine is idled up for period of time after the internal combustion engine has been started, thus increasing the duty ratio of the PWM control performed on the lamp-driving current to a high value and increasing headlamp brightness; and, one the engine has warmed up, the rotational speed of the engine decreases to the idling rotational speed, thereby switching the duty ratio of the PWM control performed on the lamp-driving current to a low value and reducing headlamp brightness. By contrast, when the engine is restarted immediately after having been stopped, no idling up is performed; thus, the duty ratio of the PWM control performed on the lamp-driving current is switched to a low value and the lamp is illuminated at a reduced brightness. In this way, it is therefore not preferable that there be a difference in headlamp brightness immediately following engine startup between when the engine is started in a warm state and when it is started in a cold state, as this may feel unnatural to the user.

Thus, in a preferred aspect of the present invention, the lamp conducting control unit is configured so that startup duty control, in which the on/off duty ratio when the headlamp is first powered after internal combustion engine startup is complete is set to an initial illumination duty ratio having a value greater than the normal duty ratio used during idling.

Such a configuration allows for uniform headlamp brightness immediately after engine startup regardless of the temperature of the engine at starting, thereby preventing an unnatural feeling for the user.

Figure 13:
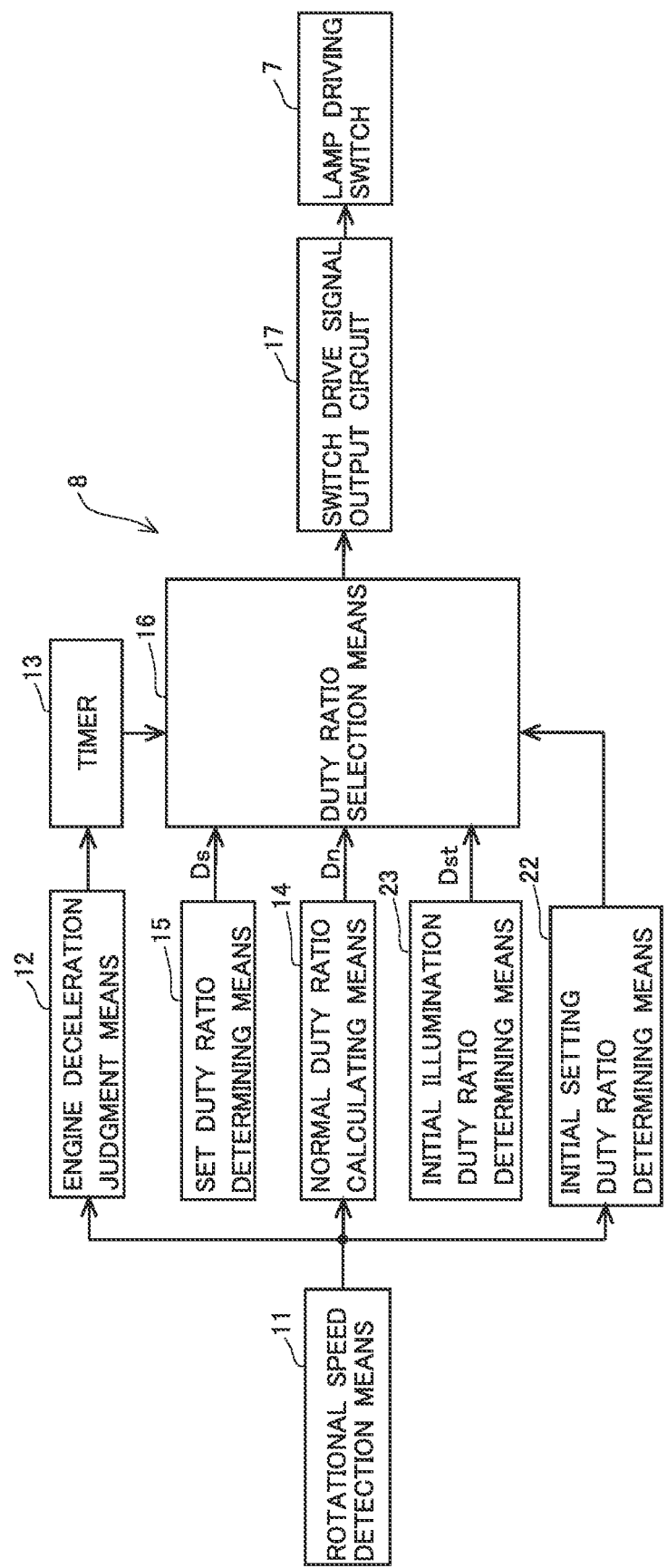
FIG. 13 is a functional block diagram showing the configuration of a lamp conducting control unit used in yet another embodiment of the present invention.

FIG. 13 is a functional block diagram showing yet another example of function blocks constituted by software when the lamp conducting control unit 8 is constituted using a microprocessor in another embodiment of the present invention. In the present embodiment, the lamp conducting control unit 8 is configured so that startup duty control, in which the on/off duty ratio when the headlamp is first powered after internal combustion engine startup is complete is set to an initial illumination duty ratio having a value greater than the normal duty ratio used during idling. Thus, the present embodiment is provided with startup completion judgment means 22 for judging whether the internal combustion engine has completely started up on the basis of the engine rotational speed detected by the rotational speed detection means 11, and initial illumination duty ratio determining means 23 for determining an initial illumination duty ratio Dst having a value greater than a normal duty ratio Dni used during idling when the startup completion judgment means assesses that engine startup has completed. Other features are similar to those of the example shown in FIG. 5, apart from the duty ratio selection means 16 having different functions.

The duty ratio selection means 16 used in the present embodiment selects and outputs an initial illumination duty ratio Dst having a value greater than the normal duty ratio used during idling as the on/off duty ratio of the lamp driving switch 7 when the headlamp is first powered after internal combustion engine startup is complete. The duty ratio selection means 16 also selects and outputs the normal duty ratio Dn calculated by the normal duty ratio calculating means 14 as the on/off duty ratio D of the lamp driving switch 7 when the engine deceleration judgment means 12 assesses that the internal combustion engine is not decelerating, or that the engine is decelerating but the rotational speed of the engine has not decreased to a set speed, and the timer 13 is not measuring time, and selects and outputs the set duty ratio Ds as the on/off duty ratio D of the lamp driving switch 7 when the engine deceleration judgment means 12 assesses that the rotational speed of the engine has decreased to the set velocity during deceleration and the timer 13 is measuring time.

Figure 14:
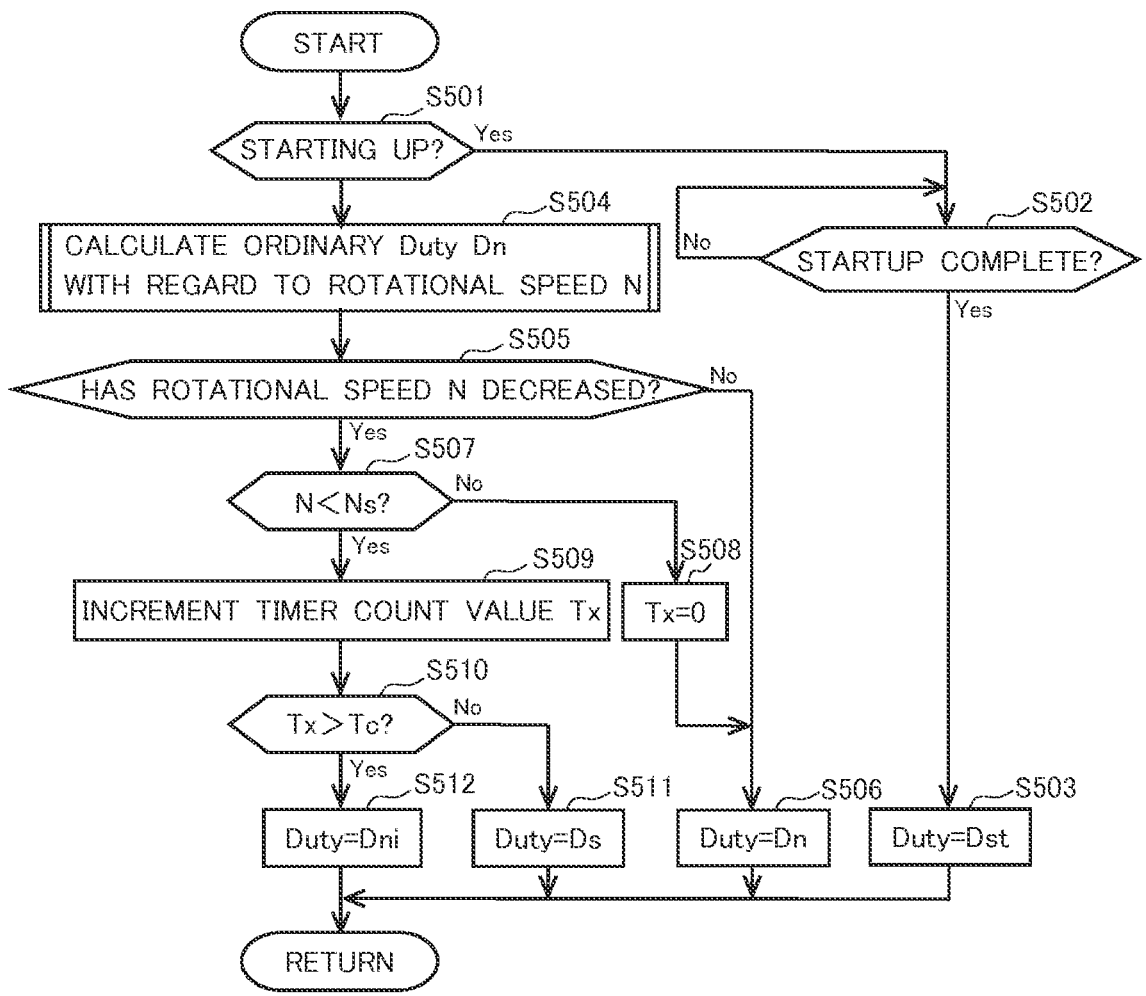
FIG. 14 is a flow chart showing yet another example of an algorithm for a program executed by a microprocessor in order to constitute the lamp conducting control unit shown in FIG. 13.

FIG. 14 is a flow chart showing an example of an algorithm for a task process executed by a microprocessor in order to constitute the lamp conducting control unit 8 shown in FIG. 13. In FIG. 14, steps S504 through S512 are identical to steps S101 through S109 in FIG. 6. The process shown in FIG. 14 is also executed whenever a task process timing arising at predetermined time intervals is reached. When the task process is begun, it is first judged whether the engine is being started up on the basis of the rotational speed N in step S501. If, as a result, it is judged that the engine is being started up, the process continues to step S502, and it is judged whether engine startup is complete. If, as a result, it is determined that engine startup is complete, the process continues to step S503, and the process ends using the on/off duty ratio of the lamp driving switch as the initial illumination duty ratio Dst. If it is judged in step S501 that the engine is not being started up, the process continues to step S504. The process is otherwise identical to the embodiment shown in FIG. 6.

In the case of the algorithm shown in FIG. 14, the startup completion judgment means 22 is constituted by steps S501 and S502, and the initial illumination duty ratio determining means is constituted by step S503. The normal duty ratio calculating means 14 is constituted by step S504, the engine deceleration judgment means 12 is constituted by steps S505 and S507, and the duty ratio selection means 16 is constituted by steps S503, S506, S510, S511, and S512.

A configuration as in the case of the present embodiment allows for uniform headlamp brightness immediately after engine startup regardless of the temperature of the engine at starting, thereby preventing an unnatural feeling for the user.

In the various embodiments described above, the set time (i.e., the time during which engine deceleration lamp conducting control is performed) need not be constant, but may be altered as appropriate. For example, the lamp conducting control unit may be configured so as to alter the set time measured by the timer according to the battery voltage when engine deceleration lamp conducting control is begun, so that, for example, the set time (i.e., the time during which engine deceleration lamp conducting control is performed) is increased when the battery voltage is equal to or greater than a set value when engine deceleration lamp conducting control is begun, and the set time is decreased when the battery voltage is less than the set value when engine deceleration lamp conducting control is begun.

If the battery has degraded, or has not been used for an extended period of time and is not sufficiently charged, the battery terminal voltage may not reach the set value during idling. In such a state, it is preferable to reduce the length of time during which engine deceleration lamp conducting control is performed. On the other hand, if the battery has not degraded and is sufficiently charged, the time during which vehicle stopping duty ratio control is performed may be increased. Thus, if the set time measured by the timer is altered according to the battery voltage when engine deceleration lamp conducting control is begun, as described above, it is possible to perform engine deceleration lamp conducting control without placing a large load upon the battery, to prevent headlamp flickering, and to maintain a high level of headlamp brightness for a predetermined period of time.

The engine rotational speed and duty ratio values shown in FIGS. 2 and 3 are merely examples, and other values may be adopted for these as appropriate. For example, it is preferable, from considerations of preventing abrupt reductions in headlamp brightness, to set the normal duty ratio Dn used during idling within a range from 50 to 80% and the normal duty ratio Dn at 2,000 r/min within a range from 81 to 90%.

In the embodiment described above, the lamp conducting control unit is configured so that engine deceleration lamp conducting control is performed by performing on/off control of the lamp driving switch at a set duty ratio set to a value greater than a normal duty ratio used by the internal combustion engine during idling, but the lamp conducting control unit may also be configured so as to perform engine deceleration lamp conducting control by keeping the lamp driving switch in an on state (at a lamp driving switch on/off duty ratio of 100%).

INDUSTRIAL APPLICABILITY

The present invention makes it possible not only to charge a battery without impediment when an engine is operating at a low rotational speed in an internal combustion engine driven vehicle in which the battery is charged using the output of a magnetic AC generator having properties such that output voltage decreases when a large load current is applied, but also to prevent abrupt reductions in headlamp brightness during the process of the engine rotational speed decreasing toward a idling speed, and therefore contributes to improving the performance of the internal combustion engine driven vehicle, and has great industrial applicability.

EXPLANATION OF NUMERALS AND CHARACTERS

1 AC generator
2 Battery
3 Headlamp
4 Power supply unit control device
5 Control rectifier circuit
6 Battery charging control unit
7 Lamp driving switch
8 Lamp conducting control unit
11 Rotational speed detection means
12 Engine deceleration judgment means
13 Timer
14 Normal duty ratio calculating means
15 Set duty ratio determining means
16 Duty ratio selection means
17 Switch drive signal output circuit
19 Acceleration control duty ratio determining means
20 Battery voltage detection means
21 Rotational speed judgment means
22 Startup completion judgment means
23 Initial illumination duty ratio determining means

The invention claimed is:

1. A power supply unit control device for an internal combustion engine driven vehicle, the device being provided with: a battery charging control unit for controlling the charging of a battery of a power supply unit of an internal combustion engine driven vehicle provided with a magnetic AC generator driven by an internal combustion engine for driving the vehicle and a battery charged by the output of the AC generator; a lamp driving switch for turning a lamp-driving current supplied from the battery to a headlamp of the vehicle on and off; and a lamp conducting control unit for performing PWM control of the lamp-driving current fundamentally by performing on/off control of the lamp driving switch using a normal duty ratio, the normal duty ratio being an on/off duty ratio for the lamp driving switch set so as to keep the lamp-driving current at a value in a range such that an output voltage equal to or greater than a terminal voltage of the battery is generated by the magnetic AC generator, wherein the lamp conducting control unit is configured so as: to cause a timer to begin measuring a set time when the rotational speed of the internal combustion engine decreases to a set rotational speed in a process in which the rotational speed of the internal combustion engine decreases towards an idling rotational speed during deceleration; and to fix the on/off duty ratio of the lamp driving switch at a set duty ratio set to a value greater than a normal duty ratio used by the internal combustion engine during idling while the timer is measuring the set time to perform on/off control of the lamp driving switch, thereby interrupting on/off control of the lamp driving switch at the normal duty ratio and performing engine deceleration lamp conducting control, in which the lamp driving switch is controlled so that lamp-driving current necessary to suppress decreases in headlamp brightness is sent to the headlamp, only for a limited period of time.

2. The power supply unit control device for an internal combustion engine driven vehicle according to claim 1, wherein the set duty ratio is set equal to a normal duty ratio at the set rotational speed.

3. The power supply unit control device for an internal combustion engine driven vehicle according to claim 1, wherein the lamp conducting control unit is configured so as to gradually alter the on/off duty ratio of the lamp driving switch toward the normal duty ratio used during idling when measurement of the set time is complete.

4. A power supply unit control device for an internal combustion engine driven vehicle, the device being provided with: a battery charging control unit for controlling the charging of a battery of a power supply unit of an internal combustion engine driven vehicle provided with a magnetic AC generator driven by an internal combustion engine for driving the vehicle and a battery charged by the output of the AC generator; a lamp driving switch for turning a lamp-driving current supplied from the battery to a headlamp of the vehicle on and off; and a lamp conducting control unit for performing PWM control of the lamp-driving current fundamentally by performing on/off control of the lamp driving switch using a normal duty ratio, the normal duty ratio being an on/off duty ratio for the lamp driving switch set so as to keep the lamp-driving current at a value in a range such that an output voltage equal to or greater than a terminal voltage of the battery is generated by the magnetic AC generator, wherein the battery charging control unit is configured so as to perform acceleration charging stop control, in which battery charging is stopped, when it is detected that the vehicle is being accelerated and the lamp conducting control unit is configured so as: to interrupt on/off control of the lamp driving switch at the normal duty ratio in a process in which the rotational speed of the internal combustion engine decreases towards an idling rotational speed during deceleration, and perform engine deceleration lamp conducting control, in which the lamp driving switch is controlled so that lamp-driving current necessary to suppress decreases in headlamp brightness is sent to the headlamp, only for a limited period of time; and to perform acceleration duty control, in which the duty ratio is increased to an acceleration control duty ratio set to a value equal to or greater than that of a normal duty ratio immediately prior to the starting of acceleration charging stop control when the acceleration charging stop control is being performed.

5. The power supply unit control device for an internal combustion engine driven vehicle according to claim 4, wherein the lamp conducting control unit is configured so as to use a map showing a relationship between the rotational speed of the internal combustion engine and the acceleration control duty ratio during acceleration charging stop control, and to search the map with regard to the rotational speed of the internal combustion engine in order to determine the acceleration control duty ratio.

6. The power supply unit control device for an internal combustion engine driven vehicle according to claim 4, wherein the lamp conducting control unit is configured so as to determine the acceleration control duty ratio by adding a constant value to a normal duty ratio immediately prior to the starting of acceleration charging stop control.

7. The power supply unit control device for an internal combustion engine driven vehicle according to claim 4, wherein the lamp conducting control unit is configured so as to monitor the voltage of the battery when the acceleration charging stop control is being performed, and determine the acceleration control duty ratio according to the battery voltage to keep headlamp brightness at a brightness immediately prior to the starting of acceleration charging stop control.

* * * * *